Jan. 11, 1966
P. A. JOHNSON
3,228,407
METHOD AND APPARATUS FOR MIXING A SUBSTANCE
WITH WATER FLOWING THROUGH A CONVENTIONAL
HOUSEHOLD WATER VALVE
Filed Jan. 18, 1963
4 Sheets-Sheet 2
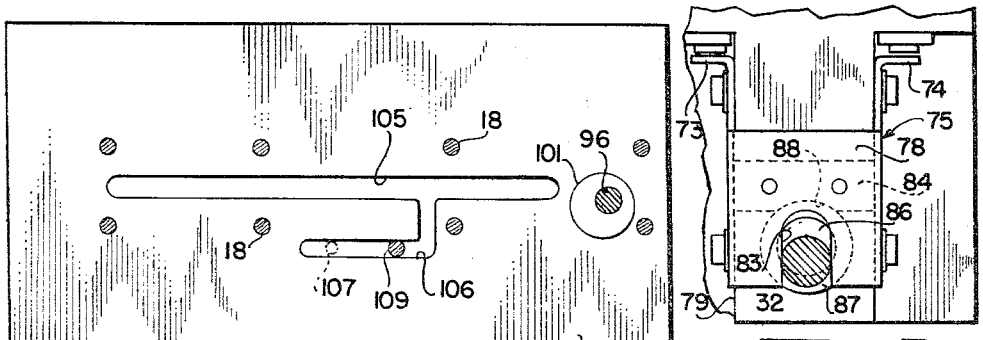
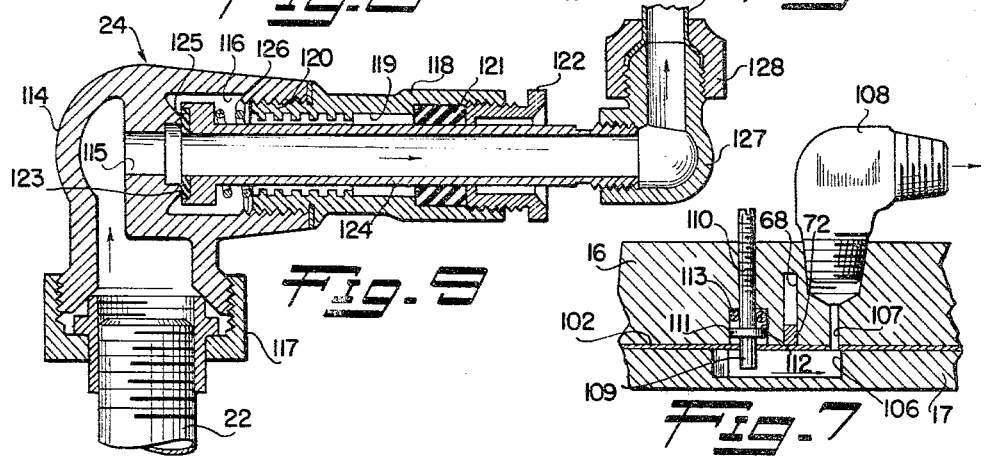
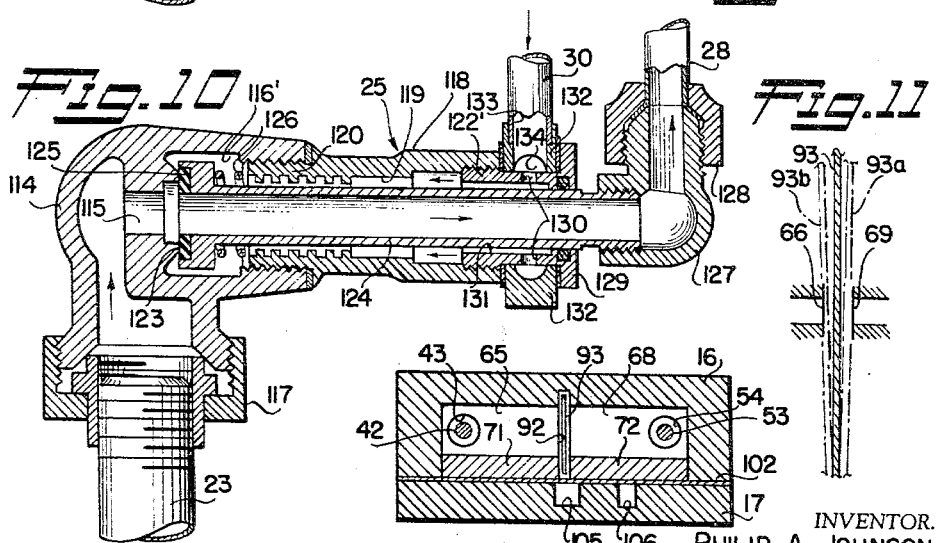
INVENTOR.
PHILIP A. JOHNSON
BY R. E. Geauque
Attorney Jan. 11, 1966 P. A. JOHNSON 3,228,407
METHOD AND APPARATUS FOR MIXING A SUBSTANCE
WITH WATER FLOWING THROUGH A CONVENTIONAL
HOUSEHOLD WATER VALVE
Filed Jan. 18, 1963 4 Sheets-Sheet 3
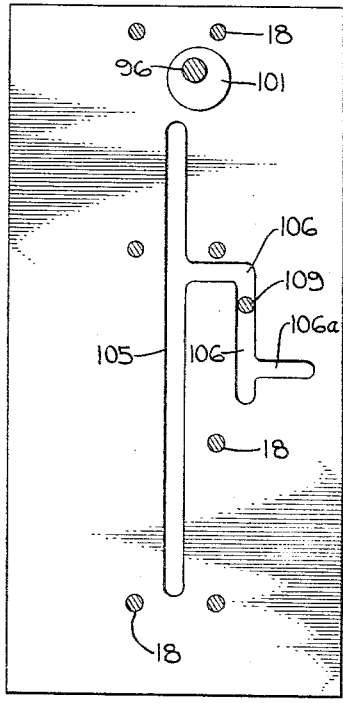
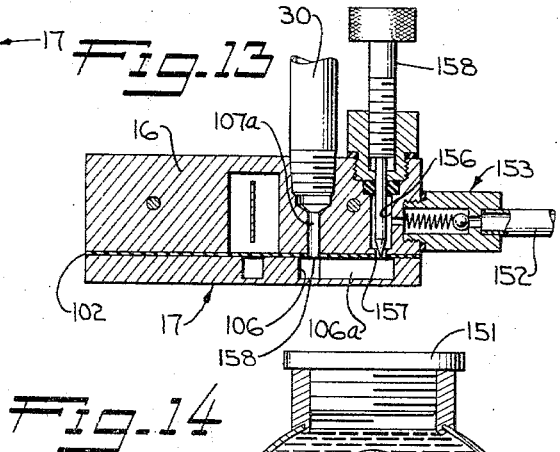
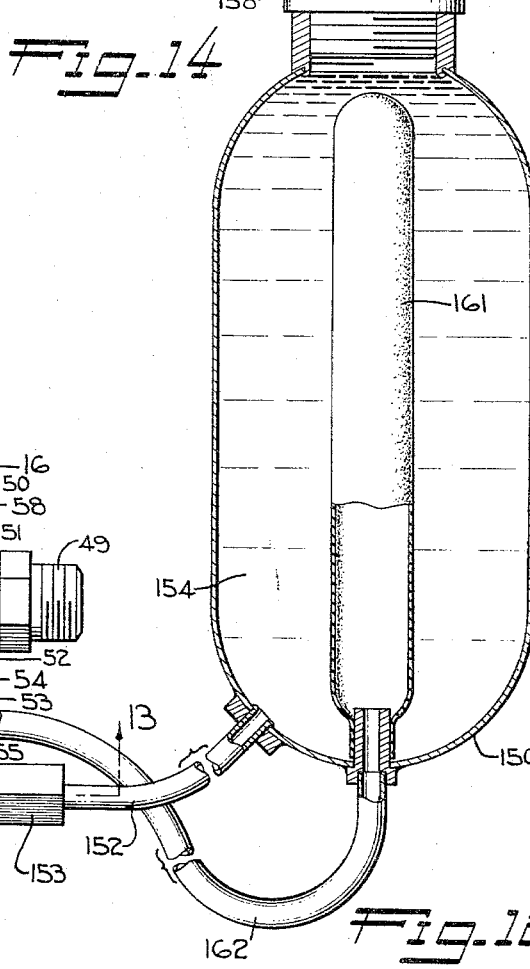
INVENTOR.
PHILIP A. JOHNSON
BY
ATTORNEY.

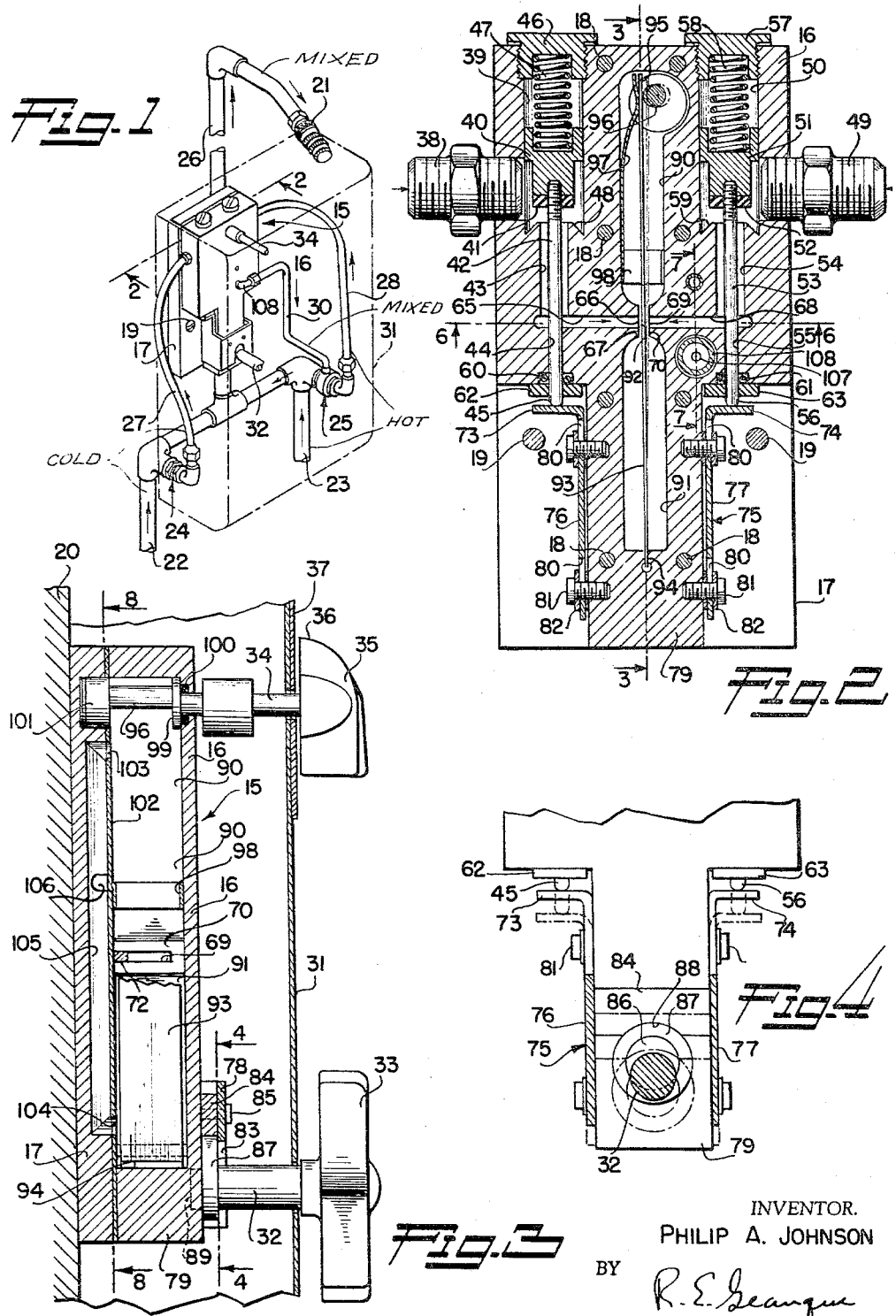

United States Patent Office 3,228,407
Patented Jan. 11, 1966

3,228,407
METHOD AND APPARATUS FOR MIXING A SUBSTANCE WITH WATER FLOWING THROUGH A CONVENTIONAL HOUSEHOLD WATER VALVE
Philip A. Johnson, St. Louis, Mo., assignor of fifteen percent to Richard L. Gausewitz, Santa Ana, Calif.
Filed Jan. 18, 1963, Ser. No. 252,512
21 Claims. (Cl. 137—3)

This application is a continuation-in-part of my co-pending patent application Serial No. 744,575, filed June 25, 1958 for a Temperature Control Device and Installation Therefor now abandoned.

This invention relates to a temperature control device for controlling the temperature of mixed fluids and more particularly to an installation for such a control device which permits the control device to be easily and quickly installed in showers and the like to select and maintain a desired water outlet temperature. This invention also relates to a method and apparatus for mixing a substance with water flowing through a conventional household water valve.

Various types of water temperature control devices are presently in use for mixing hot and cold fluids to maintain a desired outlet fluid temperature. These devices regulate the volume flow of the hot and cold fluids by valve means which are either hand operated or temperature controlled.

Because of the complexity of such devices, they are not economically suitable or structurally acceptable for incorporation in existing piping installations.

The tempearture control device of the present invention utilizes a temperature sensitive element, such as a bi-metallic strip, as the valve for both the hot and cold fluid passages. A portion of the element moves between opposed inlets for the hot and cold fluid passages to control the supply of each fluid to the mixing compartment and the resulting temperature of the mixed fluid is adjusted by simply changing the position of the element relative to the inlets. The pressure within the mixing compartment is maintained at substantially line pressure so that there are no resultant pressure forces acting upon the element, and the discharge from the inlets into the mixing chamber is on opposite sides of the element to produce counter balancing forces on the element.

Because of the simplicity of the present temperature control device, it can be quickly incorporated in existing piping without the use of special valves and piping. In the usual shower or sink installations, separate valves are provided for the hot and cold water supplied to a common outlet. By slightly modifying the valve fittings, the hot and cold water can be supplied to the temperature control device and the mixed water at the desired temperature can be returned through one of the valve fittings to the common outlet. The elements, provided by the present invention for modifying existing valve fittings, replace the existing valve stems with a stem passage which directs the hot and cold fluid to the temperature control device. The fluid mixed within the control device is then supplied to one of the fittings exteriorally of the stem passage so that the mixed fluid can pass directly to the common outlet. The flow control for the fluid is accomplished by separate valve means incorporated in the control device itself. Thus, the present invention provides a simplified and economical temperature control device which is easily installed in present piping installation.

It is therefore an object of the present invention to provide a temperature control device for mixing fluids and controlling the discharge temperature, said device utilizing a temperature sensitive element as the valve for controlling the flow of each fluid into a mixing chamber.

A further object is to provide a method and device for mixing a substance with water flowing through a conventional household water valve, without the necessity of damaging the wall in which the valve is mounted.

Another object of the invention is to provide a temperature control device having a bi-metallic strip located in a mixing chamber, with one portion of the strip simultaneously controlling the inlets for hot and cold fluid into the mixing chamber, the position of said strip being adjustable to control the temperature of the mixed fluid discharged from the mixing chamber.

A further object of the invention is the provision of a temperature control device in which a single bimetallic strip controls the amount of hot and cold water entering a mixing chamber to maintain a selected temperature of the mixture, the pressure within said mixing chamber being maintained at substantially line pressure to eliminate pressure force on this strip.

A further object of the invention is to provide an installation for attachment to existing piping, said installation including a temperature control device and novel fitting therefor to provide a desired mixed fluid temperature.

Another object of the invention is to provide replacement elements for standard fluid valves which permit quick and easy incorporation of the temperature control device into existing piping installations.

Another object is to provide an improved method and apparatus for mixing soap, water of a different temperature, and other substances with the water flowing through a conventional household water valve.

These and other objects and advantages of the invention will be more fully set forth in the following specification and claims, considered in connection with the attached drawing to which they relate.

In the drawings:

FIGURE 1 is a perspective view of the temperature control device of the present invention connected with modified valve fitting for a shower installation;

FIGURE 2 is a horizontal section along line 2—2 of FIGURE 1 showing the separate valves for the hot and cold water passages and the bi-metallic element for controlling the hot and cold water inlets to the mixing chamber;

FIGURE 3 is a transverse vertical section along line 3—3 of FIGURE 2 showing one of the water inlets and the cam for adjusting the position of the bi-metallic strip to control the temperature of the mixed water;

FIGURE 4 is a vertical section along line 4—4 of FIGURE 3 illustrating the cam mechanism for controlling the valves for the water passages;

FIGURE 5 is a top plan view of the cam mechanism shown in FIGURE 4;

FIGURE 6 is a transverse vertical section along line 6—6 of FIGURE 2 illustrating the relationship of the bi-metallic strip to the water inlet passages;

FIGURE 7 is a vertical section along line 7—7 of FIGURE 2 illustrating the regulating valve in the water discharge passage;

FIGURE 8 is a vertical section along line 8—8 rotated into horizontal position and showing the water discharge passages in the base plate;

FIGURE 9 is a sectional view of the modified cold water valve fitting showing the stem passage which replaces the usual valve stem;

FIGURE 10 is a sectional view of the modified hot water valve fitting showing the mixed water discharged passage;

FIGURE 11 is a schematic illustration of the manner in which the bi-metallic strip moves to control the water inlets.

FIGURE 12 is a sectional view corresponding to FIG-

Figure 15:
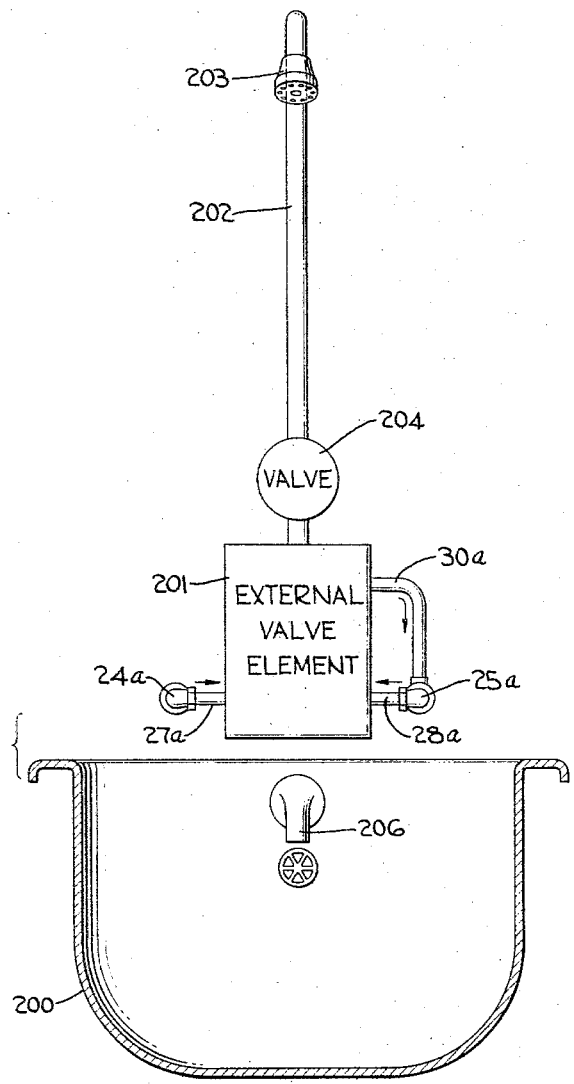

URE 2 but illustrating an embodiment in which means are provided to inject soap into the water;

FIGURE 13 is a sectional view taken on line 13—13 of FIGURE 12;

FIGURE 14 is a sectional view corresponding to FIGURE 8 but showing the modified backplate adapted for soap injection; and FIGURE 15 illustrates schematically a third embodiment, in which a shower is installed in a showerless bathtub.

Referring to FIGURES 1 and 2, the temperature control device 15 of the present invention comprises a housing 16 and a base plate 17 which are secured together by a plurality of screws 18 inserted through the base plate into the housing. The complete temperature control unit is shown secured by means of screws 19 to the exterior surface of shower wall 20 below the shower head 21. Cold water pipe 22 and the hot water pipe 23 are located behind the wall 20 and contain valve fittings 24 and 25, respectively, and both of these pipes connect with a common outlet pipe 26 located behind wall 20 and connected with the shower head 21. Only the shower head 21 and fittings 24 and 25 extend through the wall 20. The control device 15 is connected with fittings 24 and 25 through passages 27 and 28, respectivley, in order to receive hot and cold water from pipes 22 and 23 and the mixed water at the desired temperature is discharged from the device 15 through passage 30 to the fitting 25 from which it passes to the common pipe 26 and then to the shower head 21. A cover 31 is placed over the temperature control device 15, the extending portions of the fittings and the tubing connecting same, and this cover is secured to the exterior of wall 20 to present an attractive appearance for the overall installation.

A valve actuating stem 32 extends through the cover 31 and carries a handle 33 which is rotated to permit flow through the temperature control device and a stem 34 also extends through the cover 31 and carries a knob 35. The knob 35 has a pointer 36 which coacts with a temperature scale on a plate 37 attached to cover 31 and a desired water discharge temperature is selected by rotation of the knob 35 to a chosen indicia on the scale. Thus, the complete control unit and the piping therefor can be easily installed on the exterior of the shower wall and hidden by an attractive cover, with only the handle 33, knob 35 and scale 37 being visible.

Referring to FIGURE 2, one side of the housing 16 contains a connection 38 for connecting passage 27 with a cylindrical space 39 within the housing. The cylindrical space 39 contains a plunger 40 which carries a valve disc 41, and the plunger is connected to a valve stem 42 which extends through a reduced circular passage 43 in communication with space 39. The stem also passes snugly through an opening 44 and has an end 45 extending beyond the housing. The space 39, passage 43 and opening 44 can be drilled form the end of the housing 16 and the space 39 is closed by cap 46. A spring 47 is located in space 39 between cap 46 and plunger 40 in order to bias the plunger 40 and disc 41 towards valve seat 48 formed at the inlet to passage 43. In a similar manner, a connection 49 is contained in the opposite side of housing 16 and connects circular space 50 with the passage 28. The space 50 contains a plunger 51 carrying a valve disc 52 and is connected with a valve stem 53 extending through a circular passage 54. The valve stem also extends snugly through an opening 55 and has an end 56 located exteriorly of the housing 16. The circular space 50, passage 54, and opening 55 can also be formed from one end of the housing 16, and the space 50 is covered by a cap 57. A spring 58 is located between the cap 57 and plunger 51 in order to bias valve disc 52 against the valve seat 59 formed at the entrance to passage 54.

The housing 16 contains cut outs for O rings 60 and 61, which surround the stems 42 and 53, respectively, and these O rings are held in position by plates 62 and 63, respectively, secured to the housing. The passage 43 connects with a slit passage 65 which terminates in an opening 66 formed in a flat surface 67. In a like manner, passage 54 connects with a slit passage 68 which terminates in an opening 69 formed in a flat surface 70. The slit passages 65 and 68 can be formed by first placing a groove into the surface of the housing 16 and thereafter partially filling the groove with inserts 71 and 72 (see FIG. 6).

The valve stems 44 and 55 are moved by legs 73 and 74 of a saddle member 75, which has sides 76 and 77 and a top 78 (see FIG. 5). The saddle member is located on an extension 79 of housing 16 and each side contains two slits 80, each of which receives a screw 81 and washers 82 of greater width than the slits are located on opposite sides of each slit. Thus, the complete saddle member 75 can be moved along the housing extension 79 a distance corresponding to the length of slits 80. The top 78 of the saddle member contains a groove 83 and is separated from the surface of extension 79 by means of a cam plate 84, which is secured to the top by rivets 85. The groove 83 receives the stem 32 of handle 33 and the stem 32 carries a circular cam 86 which is surrounded by a ring 87 in engagement with a curved surface 88 on the cam plate 84. One end 89 of stem 32 is rotatable in a recess in extension 79 and the cam 86 and ring 87 are held in position between the top 78 and the extension 79.

Springs 47 and 58, acting through the stems 42 and 53, continually urge the saddle member towards the end of extension 79. As illustrated in FIGURE 4, rotation of the cam 86 to the full line position causes the ring 87 to bear against surface 88 of cam plate 84 and causes the legs 73 and 74 to move the stems 42 and 53 against the force of the springs. In the full line position, the cam 86 and the ring 87 have their center lines perpendicular to cam plate 84 and there is no resultant force developed by the springs tending to rotate stem 32. Therefore, the legs 73 and 74 will be maintained in the full line position and the valve discs 41 and 52 will be held away from valve seats 48 and 59, respectively, as illustrated in FIGURE 2. However, upon slight rotation of the cam 86 from its full line position in FIGURE 4, the force of springs 47 and 58 will cause the cam 86 and ring 87 to assume the dotted line position of FIGURE 4, in which the stems 42 and 53 are extended and the valve discs 41 and 52 are forced against the valve seats 48 and 59, respectively. Thus, by rotating the stem 32 from the dotted line position of FIGURE 4 to the full line position, the passages 43 and 54 can be placed in communication with the spaces 39 and 50, respectively. In this condition, the cold water from fitting 24 will flow through tube 27, fitting 38, space 39 and passages 43 and 65 to the slit inlet opening 66, and hot water will flow from fitting 25, through tube 28, space 50, passages 54 and 68 to the slit inlet opening 69.

The housing 16 contains elongated mixing chambers 90 and 91 which communicate with each other through the space 92 between opposed surfaces 67 and 70. The chambers 90 and 91 are open at the surface of the housing adjacent the base plate 17. A bi-metallic element 93, in the form of a flat strip, is anchored at end 94 in the extension 79 and extends through chambers 90 and 91 and through space 92. The other end 95 of the element is biased against an eccentric shaft 96 located in chamber 90, by means of a leaf spring 97 bearing against end 95. The end of the leaf spring 97 is anchored by a rectangular spring clip 98 which is forced into chamber 90 in order to hold the end of the spring against the side of the chamber. Eccentric shaft 96 is secured in off center position to a circular disc 99 carried at the end of stem 34 which projects into chamber 90, and an O ring 100 serves to seal the end of the stem. The other end of eccentric shaft 96 is secured in an off center position to a circular disc 101 located within a recess in base plate 17.

Upon rotation of the knob 35, the eccentric shaft 96 will prescribe a circular path and since end 95 of element 93 is continually held against the surface of the eccentric shaft 96, the end can be moved in either direction from the center position shown in FIGURE 2. For instance, if the eccentric shaft is rotated in a clockwise direction to the dotted line position of FIGURE 2, the end 95 will move with the eccentric shaft, and the bi-metallic strip 93 will assume the dotted line position wherein the element is adjacent surface 70. If the eccentric shaft 96 is rotated counter clockwise in FIGURE 2, the strip will be moved in the opposite direction and against the surface 67. It is understood that the strip can be located in any positions in between these limits of movement by positioning the knob 35. As illustrated in FIGURE 3, the strip 93 is of less width than the chambers 90 and 91 so that mixing can take place between opposite sides of the chambers 90 and 91 around the strip. Water entering these chambers from inlets 66 and 69 is therefore mixed in chambers 90 and 91 and the temperature of the mixture will depend upon the quantities of hot and cold water passing through the inlets. These quantities are determined by the position of the strip 93 within the space 92 between the inlets, since this portion of the strip serves as a valve for controlling flow through both of the inlets.

The element 93 can be selected of any suitable bi-metallic compositions and preferably the strip will be straight at room temperature. In operation of the device, eccentric shaft 96 will position the end 95 of the strip to correspond with the desired temperature of the mixed water within chambers 90 and 91. If the hot and cold water entering the chambers from inlets 66 and 69 result in a mixed water temperature which is hotter than the desired temperature, the bi-metallic strip 93 will sense this temperature and become bowed in a direction to close down inlet 69 and open inlet 66 to reduce the flow of hot water and increase the flow of cold water. On the other hand, if the temperature of the mixed water is too low, the bi-metallic element will become bowed in the opposite direction to reduce the quantity of cold water from inlet 66 and increase the quantity of hot water from inlet 69. Thus, for given temperature sources of cold water and of hot water, the bi-metallic element will quickly assume a stable position in which the required amounts of hot and cold water are supplied to the chambers 90 and 91 to maintain the desired mixed temperature. If, thereafter, the source temperature of the cold or hot water is changed, a new stable position will be assumed by the strip 93 to maintain substantially the desired temperature of the mixed water by changing the quantities of each entering the chambers 90 and 91. It is understood that a change in either of the water source temperatures will result in a new equilibrium position of the bi-metallic strip which will result in only a slight change in the mixed water temperature because of the sensitivity of the strip to small variations in temperature.

The action of the strip 93 in regulating the flow through inlets 66 and 69 is schematically illustrated in FIGURE 11. The dotted line position 93a is assumed by the strip in order to cut down the flow of hot water and increase the flow of cold water, whereas the dotted line position of 93b is assumed when more hot water and less cold water is required. From the above explanation it will be apparent that by moving the end 95 of the strip 93, the strip 93 will assume different locations between the inlets 66 and 69 and different mixed water temperatures will result at these different positions. After the end 95 is fixed, the strip will move in response to the temperature within the mixing chambers to maintain the desired temperature of the mixed water by simultaneously controlling the inlet openings 66 and 69.

A gasket 102 is located between housing 16 and the base plate 17 and contains openings for the assembly screws 18 and for the cylinder 101. Also, the gasket contains openings 103 and 104 which connect chambers 90 and 91, respectively, with the ends of a grooved passage 105 in the base plate, the remainder of the passage 105 being separated from the chambers by the gasket. An L-shaped branch passage 106 is also formed as a groove in the base plate and connects with passage 105. The end of the branch passage 106 communicates with a restricted orifice passage 107 in the housing 16 through an opening in the gasket 102 and the orifice passage connects with a fitting 108 secured to the housing. The passage 106 also contains a movable valve element 109 which is about the width of the passage. The element 109 is formed at the end of a stem 110 which is threaded into an opening in the housing 16 and the stem carries a disc 111 located in a recess 112 in the housing to serve as a limit stop. An O-ring 113 in recess 112 acts to seal the housing around the stem 110.

It is apparent from the above description that the mixed water at the selected temperature will be discharged from chambers 90 and 91 to the passages 105 and 106 and through orifice passage 107 to fitting 108. Because of the reduced size of orifice passage 107, the pressure within the discharge passages 105 and 106 and within chambers 90 and 91 will be maintained at substantially the line pressure of the hot and cold water sources. Thus, there will be no resultant forces on the strip 93 due to the pressure variation in the chambers or due to the fluid bow from inlet passages 66 and 69 against the strip. The pressure throughout the chambers and on opposite sides of the strip 93 will be equal and maintained at about line pressure and the inlet opening will discharge into the chambers at substantially the same pressure. Also, since inlet opening discharges against opposite areas of the strip, no resultant dynamic force will develop against the strip. The volume of discharge flow through passage 106 is controlled by movement of valve element 109 to open or close the area of the passage at the valve element. Therefore, the orifice passage 107 acts to limit the discharge flow to a selected maximum even when the valve element 109 is in its fully open position and regulation of the valve element serves to select a flow at a desired rate below this maximum.

The construction of the openings 66 and 69 as slits, instead of round for example, is also important in minimizing the effects of velocity and pressure on the bi-metallic strip 93. This is because the flow out of each port is through a cross-sectional area determined by multiplying the perimeter of such port and the distance between it and the bi-metallic strip. On the other hand, the pressure on the bi-metallic element, tending to overcome its natural temperature-responsive setting, is determined by multiplying the area of the port by the pressure differential between opposite surfaces of the bi-metallic element. It follows that the same flow can be obtained, with less pressure disturbance of the bi-metallic strip, by employing the port (preferably a slit) having a ratio of perimeter to area which is substantially larger than that of a circle.

The above-mentioned factors, including the important factor of discharging water simultaneously from both chamber 90 and 91 so that there will be no stagnant water to prevent proper sensing of the temperature of the outflowing water by the full length of the bi-metallic element, combine to make the apparatus highly sensitive to temperature variations and insensitive to differences between the pressures of the inflowing hot and cold water.

The construction of modified fittings 24 and 25 are illustrated in FIGURES 9 and 10, respectively. The fitting 24 for the cold water passage 22 comprises a standard elbow member 114 containing a passage 115 connecting with space 116 which communicates with the common passage 26 leading to the shower head. One end of elbow member 114 is connected to pipe 22 by coupling 112 and the other end receives a member 118 containing a passage 119 which is threaded at end 120. The passage 119 is closed at the opposite end by packing 121 and nut 122. In the standard fitting, passage 119 would contain a solid valve stem threaded to end 120 and extending through nut 122 to receive a water regulating handle at one end. The other end of such a stem carries a valve which coacts with seat 123 of passage 115 to control the water flow to space 116. Such a standard fitting has been modified by replacing the valve stem with a tubular passage 124 which is slidable within passage 119 and carries a valve disc 125 continually held by spring 126 against seat 123. The other end of passage 124 communicates with passage 27 through connecting members 127 and 128. Thus, the stem passage 124 continually cuts off the flow of cold water to space 116 and directs all the water to passage 27 and fitting 38 of the control device 15. In modifying the standard fitting, it is only necessary to unthread the member 118, remove the handle on the standard valve stem, and unthread the valve stem from member 118. Thereafter, the tubular passage 124, with spring 126 attached, is located in passage 119 and member 118 reassembled with member 114.

Referring to FIGURE 10, wherein like reference numerals designate like parts, the elbow member 114 is connected to hot water passage 23 and the valve disc 125 at the end of tubular passage 124 is forced against seat 123 by spring 126 to direct all the hot water to passage 28 and to fitting 49 of control device 15. One end of member 118 is threaded to elbow member 114 and the other end receives a modified nut 122' which has an enlarged head 129 and a plurality of side openings 130. Also, the interior diameter of nut 122' is larger than passage 124 to provide a passage 131 which communicates with passage 119 since the standard packing 121 has been removed. A ring manifold 132, formed integrally with passage 30, is located between the end of member 118 and the head of 129 of nut 122' and the manifold contains an axial opening 133 for connecting passage 30 with a circular internal groove 134. The passage 124 is of less diameter than the threaded end 120 of member 118 so that passage 119 extends completely through member 118.

It is therefore apparent that the mixed water discharged from control device 108 is connected through passage 30, manifold 132, and passage 131 and 119 to the space 116' which communicates with the common passage 26 leading to the shower head 21. In assembling the fitting 25, the standard valve stem is removed and the stem passage 124 assembled in the same manner as described in connection with fitting 24, except that the packing 121 and nut 122' are discarded. The ring manifold 132 is then placed adjacent the end of member 118 and secured in position by nut 122'.

As described, the complete piping installation of the temperature control device can be accomplished with the passages 27, 28 and 30 and fittings therefor, including the ring manifold attached to passage 30. Also, to modify the fittings 24 and 25, only two tubular passages 124 are required together with a nut 122'. Since the passages 27, 28 and 30 are formed of semi-flexible tubes, such as copper tubing, the tubing can be adjusted by bending to fit various valve spacings. Also, no separate valve elements are required since the bi-metallic strip 93 controls the flow directly. The temperature control device 15 can also be easily installed in any new plumbing installation. In a new shower installation, the hot and cold water pipes 22 and 23 and discharge pipe 26 would extend through wall 20 and connect directly with device 15 mounted on the exterior surface of the wall.

A feature of the present invention resides in the fact that the valve handle 33 positions valve discs 41 and 52 either in the full on or off position. In the fully open position, maximum flow to the mixing chambers is assured so that a full pressure build up in the chambers takes place. Since the valve discs 41 and 52 are located upstream of the mixing chambers, no interchange of hot and cold water takes place in the chambers when the control device is not in operation and water cannot flow from the hot passage to the cold passage and vice versa, as would result if the water flow were controlled by a valve in the discharge side of the device. Another feature of the invention resides in the fact that the eccentric shaft 96 is so positioned in the high temperature range that the bi-metallic strip will completely close off the hot water passage if scalding temperatures are approached so that the highest temperature possible is inherently limited by the eccentric shaft 96.

The present specification and claims are written (for purposes of simpler terminology) with relation to the usual situation in which each household water valve is so connected that the valve stem extends through the outlet water chamber of the valve instead of through the inlet water chamber thereof. It is to be understood, however, that the claims are to be interpreted as covering the reverse situation wherein the valve stem extends through the inlet water chamber. In such reverse situation, water would be drawn off through the valve stem opening from the inlet chamber, and returned to the outlet chamber via a water conductor extending through the inlet chamber to the valve port.

*Embodiment of FIGURES 12–14*

The present method and apparatus are particularly adapted to mix a substance with water flowing through a conventional household water valve. For purposes of the present specification and claims, the word "substance" is hereby defined to include various solids in particulate form, gases and liquids, including water of a different temperature than that flowing through the valve. Thus, for example, if hot water is mixed with cold water which has been withdrawn from a valve, the hot water is a "substance" and is comprehended within the appended claims.

FIGURES 12–14 illustrate an embodiment wherein the injected substance is liquid soap or detergent. Except as will be specifically stated, the embodiment of FIGURES 12–14 is identical to that previously described.

Referring to the right portion of FIGURE 12, a rigid soap container 150 having a threaded fill plug 151 is connected through a soap-feed conduit 152 to a check valve 153. Valve 153 is, as shown in FIGURE 13, adapted to permit feeding of liquid soap 154 into but not out of a passage 156 in housing or body 16. From passage 156, the soap flows through a port 157 in gasket 102. Flow through such port is controlled and (when desired) shut off by means of a manually operable needle valve 158.

Port 157 communicates with a lateral extension 106a of branch passage 106 in base plate 17. Thus, soap is delivered at a controlled rate to passage 106. From passage 106, the soap passes through a port 158 in gasket 102 to a constricted passage 107a and thus to the outlet conduit 30 leading to the previously-described injector fitting. Passage 107a replaces and corresponds to passage 107 described relative to FIGURE 7, the fitting 108 shown in FIGURE 7 being omitted from FIGURE 13.

The soap is forced into the system from container 150 by means of an expandable pressurizing bladder 161 mounted axially thereof. A pressurizing tube 162 leads from the bladder to inlet passage 54. Therefore, when and only when valve handle 33 is turned to the "on" position, bladder 161 is expanded by static water pressure to pressurize the soap in the container.

*Embodiment of FIGURE 15*

Various other types of apparatus are also comprehended within the scope of the present invention. For example, water may be withdrawn through the stem openings of faucets which project from the wall above a showerless bathtub. Such water is routed through an external, manually-operated shutoff and control valve, from whence it is re-injected through at least one of the stem openings for flow to the nozzle which supplies water directly to the tub. Furthermore, a portion of such water may be passed upwardly through the external valve through an external vertical pipe to a shower head. Thus, without damage to the wall and without need of a plumber, a showerless bathtub is supplied with a shower.

In the schematic representation of FIGURE 15, the fittings 24a and 25a correspond to those described above in detail, and fit into the stem openings of valves above a showerless bathtub 200. The valve means is indicated at 201 and is mounted outside the wall through which the stems (removed when fittings 24a and 25a were mounted) projected. The standpipe 202 leading to shower head 203 is also mounted outside the wall, having a control valve 204 therein to start and stop the flow of water. A suitable decorative housing, not shown, may be employed to cover the valves and fittings.

In the operation of the embodiment of FIGURE 15, hot and cold water is drawn off through pipes 27a and 28a and supplied to element 201 where it may be mixed, thermostatically or otherwise. Then, depending on the condition of vaves 201 and 204, it may be either fed back through conduit 30a and the internal (original) piping to nozzle 206 for tub 200, or else fed through the newly-supplied external standpipe 202 to shower head 203. Furthermore, water may be delivered simultaneously to shower 203 and nozzle 206.

Various embodiments of the present invention, in addition to what has been illustrated and described in detail, may be employed without departing from the scope of the accompanying claims.

I claim:

1. A method of mixing a substance with water flowing through an upstream pipe and thence through a conventional household water valve to a discharge point, said valve having inlet and outlet water chambers separated by a ported partition, the port in said partition being adapted to be opened and closed by a sealing means on a movable valve stem, which method comprises removing said valve stem, introducing a water conductor into said outlet water chamber and at least to said port, causing the interior of said water conductor to communicate with said inlet water chamber and thus with said upstream pipe, whereby water passes out through said water conductor from said inlet water chamber, mixing a substance with said water which passed through said water conductor, and passing said water having said substance mixed therewith through said outlet chamber and thus to said discharge point.

2. A method of controllably mixing hot and cold water flowing to a common discharge means through a hot water valve and a cold water valve each having inlet and outlet water chambers separated by a ported partition, each of said valves also having a sealing means mounted on a movable valve stem to open and close the port in the associated partition, the inlet chamber of said hot water valve communicating with a hot water pipe and the outlet chamber thereof communicating with said common discharge means, the inlet chamber of said cold water valve communicating with a cold water pipe and the outlet chamber thereof communicating with said common discharge means, which method comprises removing the valve stem of each of said valves, introducing a water conductor through the opening previously occupied by said valve stem and into said outlet water chamber of each of said valves, causing the interior of each water conductor to communicate with the associated inlet chamber and thus with the associated water pipe to thus effect flow of hot and cold water through said water conductors, blocking flow of water between the inlet and outlet chambers of each valve except through the associated water conductors, controllably mixing said hot and cold water which flowed through said water conductors, and passing the mixed water through the outlet chamber of at least one of said valves to said common discharge means.

3. The invention as claimed in claim 2, in which said valves each include a threaded member threadedly associated with said valve stem and extending through a portion of a wall or partition in a building, and in which said method additionally includes the steps of introducing one of said water conductors loosely through one of said threaded members in the position occupied by a valve stem prior to removal thereof, and passing said mixed water to said outlet chamber through the passage defined by the exterior wall of said water conductor and the interior wall of said one threaded member.

4. An adapter apparatus for routing water circuitously through the body of a conventional household water valve, said body having an inlet water chamber and an outlet water chamber separated by a ported partition, the valve body portion defining said outlet chamber having a normal water discharge opening therefrom and also having an opening therefrom adapted to receive a valve stem, which adapter apparatus comprises a water conductor adapted to be mounted at least partially in said outlet water chamber and said valve stem opening, means to sealingly associate the inner end portion of said water conductor with said partition at the port therein and effect communication of the interior of said water conductor with said inlet chamber, said water conductor being sufficiently long to pass water out from said inlet chamber through said valve stem opening to the exterior of said body, and means to pass at least part of said water back through said valve stem opening into said outlet chamber for outflow through said normal discharge opening of said outlet chamber.

5. The invention as claimed in claim 4, in which said water conductor is a tube inserted loosely through said valve stem opening to form an annulus around said tube, and in which said last-named means includes means to seal off said annulus so that water may be passed therethrough.

6. An adapter apparatus for routing water circuitously through the body of a conventional household water valve, said body having an inlet water chamber and an outlet water chamber separated by a ported partition, the valve body portion defining said outlet chamber having a normal water discharge opening therefrom and also having an opening therefrom adapted to receive a valve stem, which adapter apparatus comprises a water conductor adapted to be mounted at least partially in said outlet water chamber and said valve stem opening, means to sealingly associate the inner end portion of said water conductor with said partition at the port therein and effect communicating of the interior of said water conductor with said inlet chamber only, said last-named means including a compression spring seated against a portion of said water conductor and disposed in said outlet chamber, said water conductor being sufficiently long to pass water out from said inlet chamber through said outlet chamber and said valve stem opening to the exterior of said body, means for passing back to said outlet chamber the water which has flowed through said water conductor to the exterior of said body, and means to seal the space around said water conductor to prevent spilling of water from the valve body.

7. Apparatus for controllably injecting a substance into water flowing through the body of a conventional household water valve having an inlet water chamber and an outlet water chamber, said outlet water chamber having a valve stem opening communicating therewith, which apparatus comprises means to seal off said valve stem opening to prevent spilling or leaking of water therefrom, and means for starting and stopping flow of water through said valve body in the absence of a valve stem in said valve stem opening, said last-named means including means to seal the port between said inlet and outlet water chambers, said means for starting and stopping flow further including water conductor means for passing water from the inlet chamber through the outlet chamber to the exterior of the valve without entering the outlet chamber, means for injecting a substance into said water passed exteriorly of the valve, and means for passing the water with said substance added thereto back to the outlet chamber.

8. Apparatus for controllably injecting a substance into water flowing through the body of a conventional household water valve, said body having an inlet water chamber and an outlet water chamber separated by a ported partition, the valve body portion defining said outlet chamber having a normal water discharge opening therefrom and also having an opening therefrom adapted to receive a valve stem, which apparatus comprises conduit means to pass water from said inlet chamber through the port in said partition and through said valve stem opening to the exterior of the valve body, said conduit means further operating to pass at least part of said water back through said valve stem opening to said outlet chamber from said valve body exterior, means to inject a substance into said conduit means, means to control the flow of water through said conduit means in the absence of a valve stem in said valve stem opening, and means to prevent substantial flow of water between said inlet and outlet chambers except through said conduit means.

9. A do-it-yourself mixing valve apparatus for hot and cold water flowing to a household shower head or the like, said water passing from a hot water pipe through a hot water valve to said shower head, said hot water valve having a body, said water also passing from a cold water pipe through a cold water valve to said shower head, said cold water valve having a body, said body of each of said valves having an inlet water chamber and an outlet water chamber separated by a ported partition, the valve body portion defining said outlet chamber having a normal water discharge opening therefrom and also having an opening therefrom adapted to receive a valve stem, said pipes and valve bodies being on the interior of a wall in a building, comprising a mixing means adapted to be disposed exteriorly of said wall to controllably mix water, means adapted to continuously connect said inlet chamber of each of said valves to the inlet side of said mixing means, said last-named means extending through said valve stem opening of each of said valve bodies and including means to seal with the port in said ported partition to prevent mixing of water except in said mixing means, and means adapted to connect the outlet side of said mixing means through said valve stem opening of at least one of said valve bodies to the outlet chamber thereof and thus to said shower head.

10. The invention as claimed in claim 9, in which said connector means connecting said valve bodies and mixing means are flexible tubes to permit adjustment for different valve spacings, and in which a cover is mounted to said mixing means and is sufficiently large to cover said valve stem openings and said connector means.

11. The invention as claimed in claim 9, in which means are provided to prevent substantial flow of water through said valve bodies independently of said mixing means.

12. A method of stopping and starting the flow of water in an upstream water pipe and in a downstream water pipe and in a conventional household water valve in series therewith, said pipes and the body of said valve being concealed from view by wall means, the stem of said valve extending through said wall means and being exposed to view, said valve having inlet and outlet water chambers separated by a ported partition, said outlet water chamber communicating with a valve stem opening through which said valve stem extends into said outlet water chamber and into sealing relationship with said port in said partition; which method comprises removing said valve stem, introducing a water conductor inwardly through said valve stem opening into said outlet water chamber to said port in said partition, effecting a seal around said port in such manner that all water flowing through said inlet water chamber enters and passes through said water conductor to an exposed point on the opposite side of said wall means from said valve body and said pipes, effecting a stop-start control operation at said exposed point to alternately stop and start flow of water through said water conductor, conducting at least part of the water which flowed through said water conductor back through said valve stem opening to said outlet water chamber and thus to said downstream water pipe, and providing a seal preventing leakage of water thus returned through said valve stem opening except to said downstream water pipe.

13. A combination valve and adapter apparatus; said valve comprising a body defining an inlet chamber and an outlet chamber separated by a partition having a port therein, said partition having a valve seat around said port, the portion of said valve body defining said outlet chamber having a normal discharge outlet therefrom and also having an opening therefrom adapted to receive a valve stem, said valve body being threaded around said valve stem opening to mount a threaded plug element having a passage therethrough also adapted to receive said valve stem; said adapter comprising an elongated tubular element having a flange at one end thereof, said tubular element being mounted in said passage in place of said valve stem and with said flange seated on said valve seat, and a compression spring seated in said outlet chamber around said tubular element and between said flange and said threaded plug element.

14. The invention as claimed in claim 13, in which elastomeric sealing means are mounted between said flange and said valve seat.

15. The invention as claimed in claim 13, in which means are provided to prevent flow of fluid through said threaded plug element exteriorly of said tubular element.

16. The invention as claimed in claim 13, in which coupling means are provided to connect the outer end of said tubular element to a conduit.

17. The invention as claimed in claim 13, in which said tubular element has an external diameter substantially smaller than the diameter of said passage in said threaded plug element, whereby an annulus is defined between said tubular element and the wall of said passage, and in which means are provided to introduce fluid through said annulus into said outlet chamber.

18. The invention as claimed in claim 17, in which said last-named means comprises a second plug element threadedly mounted at the outer portion of said first plug element and around said tubular element, said second plug element having port means therethrough, and an annular manifold element mounted sealingly around said second plug element and having passage means therein communicating with said port means.

19. A combination valve and adapter apparatus; said valve comprising a body defining an inlet chamber and an outlet chamber separated by a partition having a port therein, the portion of said valve body defining said outlet chamber having a normal discharge outlet therefrom and also having an opening therefrom adapted to receive a valve stem; said adapter comprising an elongated tube disposed in said valve stem opening and communicating directly with said port and thus with said inlet chamber, the outer diameter of said tube being sufficiently small that an annulus is defined therearound, means to seal off said annulus to prevent undesired leakage of water therefrom, conduit means communicating with the outer portion of said annulus remote from said port to pass fluid inwardly through said annulus to said outlet chamber, and conduit means communicating with the outer portion of said tube remote from said port to receive fluid from said inlet chamber.

20. A method of controllably drawing off water flowing through an upstream pipe and thence through a conventional household water valve to a discharge point, said valve having inlet and outlet water chambers separated by a ported partition, the port in said partition being adapted to be opened and closed by a sealing means on a movable valve stem, which method comprises removing said valve stem, introducing a water conductor into said outlet water chamber and at least to said port, causing the interior of said water conductor to communicate with said inlet water chamber and thus with said upstream pipe, sealing from each other said inlet and outlet water chambers, drawing water out through said water conductor from said inlet water chamber, diverted to a predetermined point a portion of the water thus drawn out, controlling the amount of water thus diverted, and passing the remainder of said water through said outlet chamber and thus to said discharge point.

21. A fluid conducting structure comprising a valve body having a valve seat with an opening therethrough connecting an inlet chamber and an outlet chamber in the valve body, an adapter carried by the valve body including a hollow casing having inlet and outlet apertures extending through the walls thereof, a bypass passage exterior of said casing and body connecting said apertures, passageway means in said casing connecting said opening in said valve seat to said outlet aperture and second passageway means in said casing connecting said inlet aperture to said outlet chamber.

References Cited by the Examiner
UNITED STATES PATENTS

| | | | |
|---|---|---|---|
| 196,109 | 10/1877 | Blake | 236—59 |
| 796,576 | 8/1905 | Graham | 137—614.19 X |
| 1,034,064 | 7/1912 | Bergens | 236—12 |
| 1,218,508 | 3/1917 | Barnnell | 236—12 X |
| 1,888,225 | 11/1932 | Hetherington | 236—93 |
| 1,943,705 | 1/1934 | Trubert | 236—12 |
| 1,954,903 | 4/1934 | Walker | 236—12 |
| 1,984,892 | 12/1934 | Phillips | 236—12 |
| 2,180,362 | 11/1939 | Leonard | 236—12 |
| 2,430,133 | 11/1947 | Muffly | 236—12 |
| 2,455,144 | 11/1948 | Spencer | 236—12 |
| 2,553,027 | 5/1951 | Wipanco | 236—12 |
| 2,629,580 | 2/1953 | Schultis | 137—454.6 |

FOREIGN PATENTS 383,680  10/1923  Germany.

ISADOR WEIL, *Primary Examiner.*

WILLIAM F. O'DEA, *Examiner.*